(12) United States Patent
Gunthardt

(10) Patent No.: US 6,868,639 B1
(45) Date of Patent: Mar. 22, 2005

(54) FORCE RESISTANT ARCHITECTURE

(76) Inventor: Ray R. Gunthardt, 1915 E. Loyola Dr., Tempe, AZ (US) 85282

(*) Notice: Subject to any disclaimer, the term of this patent is extended or adjusted under 35 U.S.C. 154(b) by 463 days.

(21) Appl. No.: 09/640,335

(22) Filed: Aug. 16, 2000

(51) Int. Cl.$^7$ ................................................ E04H 9/00
(52) U.S. Cl. ............................ 52/79.4; 52/79.9; 52/84; 52/236.2; 52/745.03
(58) Field of Search ...................... 52/65, 79.2, 79.4, 52/79.7, 79.9, 81.6, 84, 236.2, 236.4, 745.03, 745.08

(56) References Cited

U.S. PATENT DOCUMENTS

| | | | |
|---|---|---|---|
| 2,166,577 A | | 7/1939 | Beckius |
| 3,299,588 A | * | 1/1967 | Arnold ........................... 52/65 |
| 3,331,168 A | * | 7/1967 | Frey ............................... 52/73 |
| 3,342,008 A | * | 9/1967 | Frey ........................... 52/745.04 |
| 3,365,855 A | | 1/1968 | Vermette |
| 3,388,512 A | * | 6/1968 | Newman ........................ 52/64 |
| 3,395,502 A | * | 8/1968 | Frey ............................... 52/73 |
| 3,581,692 A | | 6/1971 | Mortellito |
| 3,596,622 A | | 8/1971 | Moore |
| 3,618,273 A | * | 11/1971 | Crandall ...................... 52/79.4 |
| 3,646,718 A | * | 3/1972 | McKenna ................... 52/79.4 |
| 3,905,166 A | * | 9/1975 | Kaiser ............................ 52/65 |
| 4,015,381 A | | 4/1977 | Schmidt |
| 4,021,989 A | | 5/1977 | Hala |
| 4,228,788 A | | 10/1980 | Moeser |
| 5,531,170 A | | 7/1996 | Ubaldi et al. |
| 5,979,121 A | * | 11/1999 | Bennington .................... 52/65 |

* cited by examiner

Primary Examiner—Brian E. Glessner
(74) Attorney, Agent, or Firm—Parsons & Goltry; Robert A. Parsons; Michael W. Goltry

(57) ABSTRACT

An architecture comprising an openwork of discrete, aerodynamic living units.

21 Claims, 3 Drawing Sheets

FORCE RESISTANT ARCHITECTURE

FIELD OF THE INVENTION

This invention relates to architectures for resisting the forces of weather.

BACKGROUND OF THE INVENTION

Inclement weather causes hundreds of millions of dollars of damage to homes and business throughout the United States and in other parts of the world every year. Much of the damage results from large amounts of rain and associated flooding and the high winds generated by severe thunderstorms, tornadoes and hurricanes and other violent weather formations. In an effort to reduce the toll that heavy rains, flooding and high winds levy against buildings both large and small, artisans spend considerable time and resources toward trying to improve construction methods, construction geometry and building systems. Although current efforts are noteworthy, existing construction methods and building configurations still easily succumb to the forces of nature that manifest from often violent yet predictable weather formations.

Thus, there is a need for improved building configurations and methods that are designed to resist the predicted forces of inclement weather.

SUMMARY OF THE INVENTION

The above problems and others are at least partially solved and the above purposes and others realized in a new and improved architecture that is constructed and arranged for resisting predicted weather forces. In a preferred embodiment, the architecture is comprised of an openwork of discrete, aerodynamic living units. The units are supported by a framework that is fixed to a foundation formed into the ground of a building site. Based on the type of weather forces expected at the giving building site, the units are shaped and positioned specifically for best accommodating the expected weather forces and for using the expected weather forces to actually bolster the structural integrity and fitness of the openwork. Consistent with the foregoing, the invention also contemplates associated methods.

BRIEF DESCRIPTION OF THE DRAWINGS

Referring to the drawings.

DESCRIPTION OF THE PREFERRED EMBODIMENT

Figure 1:
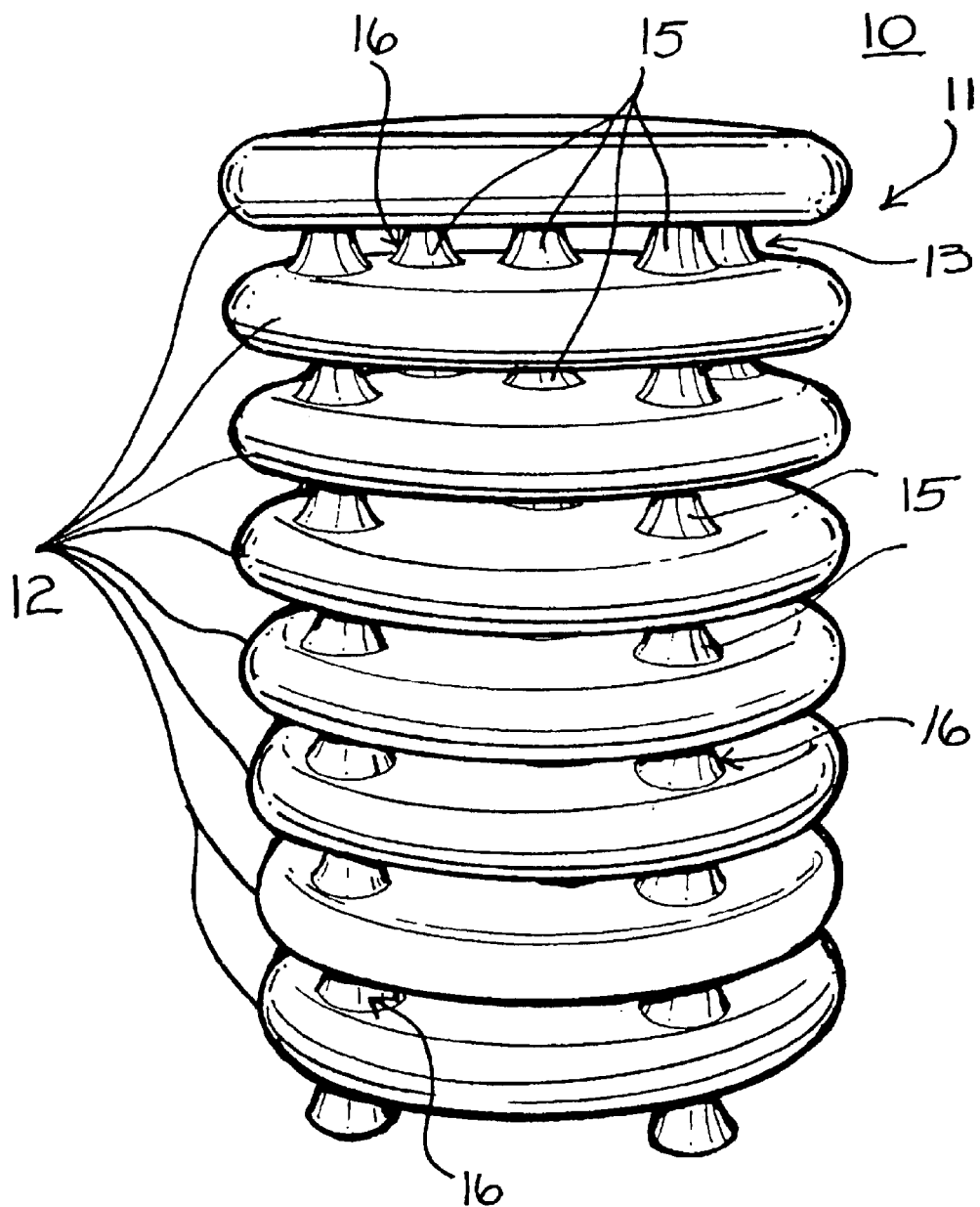
FIG. 1 is a perspective view of an architecture comprising an openwork of discrete living units, in accordance with the invention.

Turning now to the figures, FIG. 1 is a perspective view of an architecture 10 that is comprised of a cluster 11 of living units 12 that are shaped and arranged for fitness against the forces of nature that manifest from inclement weather, namely, heavy rains and associated flooding and high winds. As used in this specification, the term "architecture" refers to a building or other structure or arrangement of structural components. Living units 12 are each discrete and self-contained and built, adapted, arranged and/or provided specifically for human habitation for whatever occupation whether business, residential living, etc.

In the embodiment of FIG. 1, units 12 are supported and held by a framework 13 and are spaced from one another and arranged one above another in the form of an upstanding and substantial tower and other arrangements can be employed as will be discussed later in this specification. In this embodiment, units 12 are substantially parallel to one another and to the ground or supporting surface and one or more of them may be disposed at an angle relative to the ground or supporting surface in other building configurations, and this will be discussed more fully later in this specification. Units 12 are each formed as a substantial disk or disk-like element as characterized by a thin profile as generally defined by opposing major faces and a rounded or curved outer perimeter and other shapes may be employed. Units 12 are of substantially the same size and they may be differently or variously size, and bound a living space of one or more rooms or defined areas such as residential-type living spaces including bedrooms, living rooms, family rooms, kitchens and bathrooms, and business-oriented spaces or rooms such as conference rooms, office spaces, eating establishments, entertainment establishments, movie theaters, stores, etc. Any number of units 12 may be employed in architecture 10 such as two or more and even just one. Each unit 12 is preferably supported by framework 13 above a supporting surface, i.e. the ground as substantially shown. In accordance with conventional construction techniques, framework 13 is supported by a foundation constructed into the ground.

Framework 13 is comprised of support elements or segments 15 that can be arranged in any variety of ways for providing support for units 12. In FIG. 1, segments 15 are arranged as in a number of substantial columns such as two, three or more as shown and even less, that are each designated generally by reference character 16. Framework 13 may comprise a skeleton that is erected at a building site and to which units 12 are built or fastened to or around. Units 12 and support elements 15 may also be provided as prefabricated modular elements that may be transported to a construction site and then assembled. This is a common and increasingly popular construction method, as it ensures accuracy in the building components and reduces labor costs. In terms of modular construction, one or more or all of support elements 15 may be formed as part of units 12 for ease of assembly, and support elements 15 and units 12 may incorporate any suitable fitting apparatus or structure for facilitating a mating engagement therebetween in accordance with a modular assembly. Those of ordinary skill will readily appreciate that, consistent with this disclosure, framework 13 may take on any variety of forms and incorporate any arrangement of structural components or features. The fastening of the various elements of architecture 10 typically employ conventional building fastening techniques. In terms of materials, units 12 incorporate any suitable materials that are commonly used in the constructing of habitable structures. Because framework 13 is the structural backbone of architecture 10, it and its various elements are best constructed of steel and/or concrete or the like.

Units 12 incorporate all or at least many of the typical amenities that are normally found in habitable dwelling units such as electrical wiring, lighting, water and sewer and telephone lines, heating and cooling devices such as furnaces or air conditioners and evaporative coolers or one or more other forms of heating and/or cooling fixtures or systems, windows, fire protection or sprinkler systems, surveillance and security systems, etc. Framework 13 contains or is otherwise equipped with staircases and/or elevators for allowing people to move freely between units 12, electrical power lines, water and sewer lines, telephone lines, etc., which may be collectively referred to as utility apparatus, structure or infrastructure. The utility apparatus contained by framework 13 feeds units 12 with utility service, namely, electrical power, water and sewer service, telephone service, etc. During construction, utility lines may be established and connected between framework 13 and units 12 in a conventional manner or with complemental or associated fittings, plugs, harnesses, etc. It should be understood that the couplings between framework 13 and units 12 or other areas between framework 13 and units 12 are adapted and arranged with access openings, doorways or the like for facilitating easy human passage therebetween.

In FIG. 1, units 12 are arranged in an open condition or otherwise in what this specification deems an "openwork". This openwork configuration is an important component of the invention, and means that units 12 each exist as a discrete feature of architecture 10 independent of other units 12, with openings, gaps or spaces between them as substantially shown. As a result, winds and water can pass between and around units 12, which minimizes the resistance architecture 10 has to the force of blowing winds, rains and flooding. This, in connection with the thin or low profile, i.e. the substantial disk or disk-like shape, of each unit 12 makes architecture 10 very aerodynamic and capable of withstanding the force of oncoming winds and blowing rain and flooding that often accompanies inclement weather such as severe thunder and rain storms, tornadoes and hurricanes. Depending on the type of environmental forces that are expected at any given construction sites, the shapes of units 12 may vary as will be presently explained.

As with any construction site in accordance with the invention, expected or predicted environmental or weather forces must be taken into account prior to construction. In accordance with the invention, it is important to predict the weather forces that are likely to take place at the selected building site prior to constructing architecture 10. This can normally be accomplished by researching the regional weather that has taken place in the past in and around the region. Such information is often found in weather almanacs. After establishing a prediction of the weather and the associated forces that manifest therefrom, especially the direction from which storm fronts normally manifest and the typical direction of prevailing winds, units 12 may be shaped and cluster 11 can be erected and arranged in a manner that is best capable of resisting the predicted weather forces. To best accommodate weather forces, units 12 may be oriented or positioned relative to one another in a spaced-apart, substantially parallel condition as shown in FIG. 1, or at any one of a potentially vast array of spatial or angled orientations relative to one another and relative to the ground. In this regard, the invention contemplates shaping discrete living units and arranging them in an openwork cluster in a particular spatial orientation that allows the cluster to best accommodate or otherwise absorb the weather forces of predicted weather patterns. The invention also contemplates an openwork cluster of living units that are shaped and arranged (i.e., angled, etc.) in a particular aerodynamic manner that, in response to exposure to predicted weather forces such as predicted winds, causes the cluster to bias toward the ground or supporting surface and/or that causes the living units to bias in a particular direction, such as toward one another or toward a central or substantially central point of the cluster or other common point. Also, one, more or all of units 12 may also be mounted to rotate, move or pivot for allowing any one or more of them to yield to the force of oncoming winds and other forces of nature.

In terms of providing an architecture with a high degree of ruggedness and fitness against the forces of weather, the shape of each unit 12 may be of a potentially vast number of forms such as substantially ovoidal, flat and elongated, spheroidal, tubular, rectangular, triangular, square, trapezoidal, irregularly shaped, etc. Depending on the type or nature of predicted weather patterns and expected weather forces, the shape of each of units 12 may be identical, substantially identical or different, the attitude or angle of each of units 12 relative to one another may be identical, substantially identical or different, and the size of each of units 12 may be identical, substantially identical or different. In this vein, selected ones of a given cluster of units 12 may be identical or otherwise substantially identical in shape and size, while others constructed of other sizes or shapes.

Figure 2:
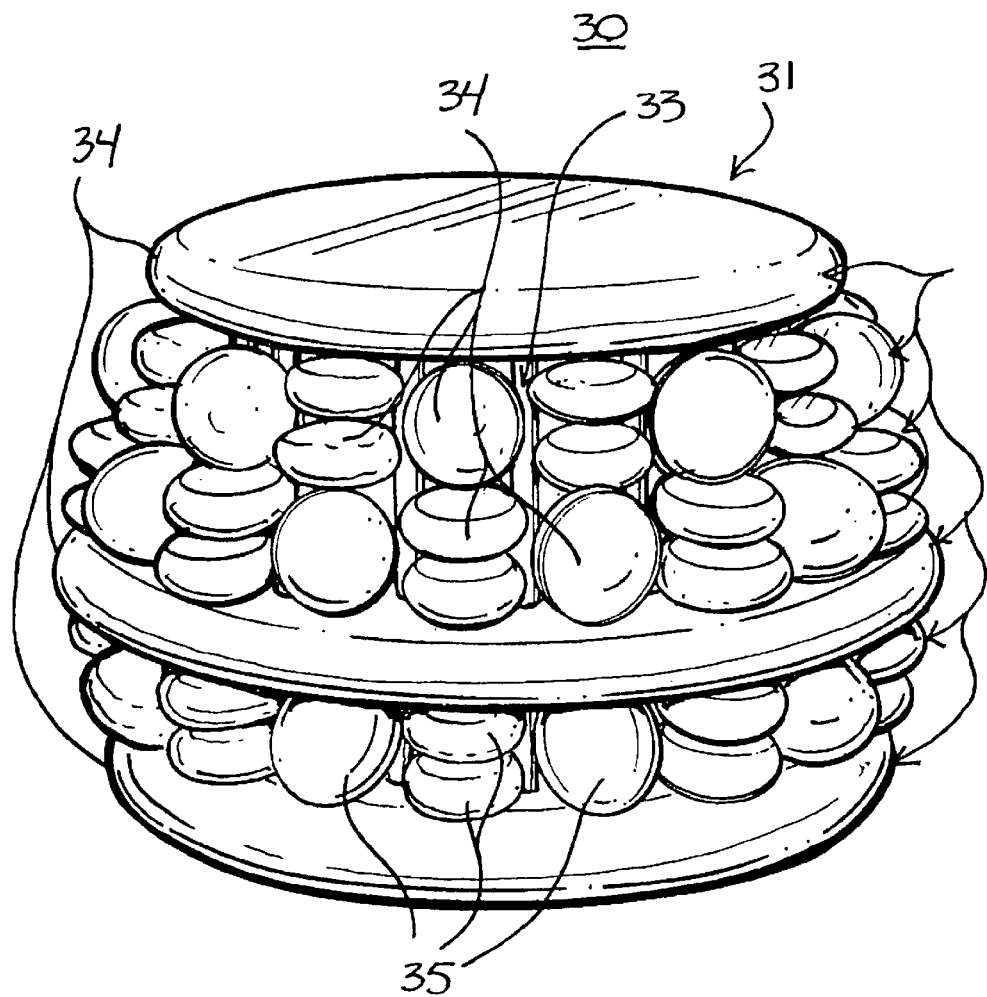
FIG. 2 is a perspective view of another architecture comprising an openwork of discrete living units, in accordance with the invention.

For instance, FIG. 2 illustrates another embodiment of an architecture 30 that is comprised of a cluster 31 of living units 32 of varying size and shape. Living units 32 are supported by or otherwise fixed to a framework 33 generally and substantially like that of architecture 10. However, unlike architecture 10, living units 32 of cluster 31 are made up of major units 34 and minor units 35. Major units 34 are each substantially disk-like in shape, but vary somewhat in size or diameter as clearly shown. Major units 34 are arranged in a substantially parallel and spaced apart condition relative to one another, and minor units 35 are arranged substantially between major units 34 in a number of groups of twos and threes as simply a matter of example and in varying or patterned positional relationships. Minor units 35 are considerably smaller than major units 34, and are each formed as a substantial oval or spheroid. The purpose of FIG. 2 is to illustrate just one example of an architecture of the invention having living units that vary in shape and size and the positional relationships between them. In this regard, minor units 35 may comprise residential living spaces, whether single or multiple family homes, and major units 34 may comprise business-oriented living spaces, and this may be reversed. In another embodiment, architecture 30 may comprise a single or multiple family dwelling or an office or business complex. Also, one, more or all of units 32 may also be mounted to rotate, move or pivot for allowing any one or more of them to yield to the force of oncoming winds and other forces of nature.

Figure 3:
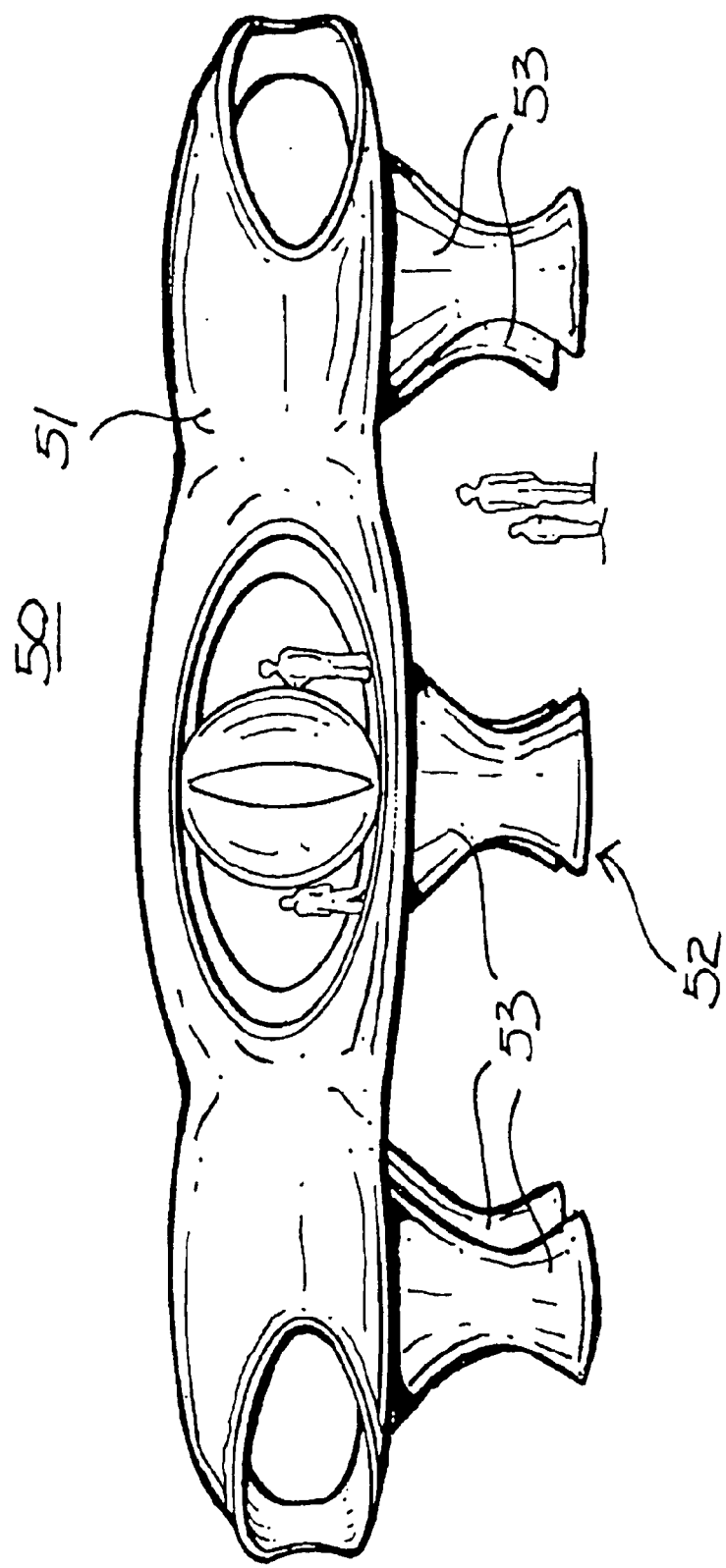
FIG. 3 is of side elevational view of yet another embodiment of an architecture constructed in accordance with the invention.

Consistent with the spirit of this invention, FIG. 3 illustrates an architecture 50 comprising a single living unit 51 supported by a framework 52. Unit 51 is curvilinear in shape for accommodating the forces of oncoming winds, and is constructed to be capable floating if it becomes dislodged from framework 52. In this embodiment, framework 52 comprises a plurality of supporting element 53 that are each curvilinear in shape, and living unit 51 or the entirety of architecture 50 may be adapted and arranged to pivot, rotate or otherwise move in response to exposure to the force of oncoming winds and other forces of nature.

Thus, new and improved architectures are disclosed that are constructed and arranged for accommodating the forces of weather. While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. An architecture comprising:

a framework carried by a supporting surface;

an openwork of discrete, aerodynamic living units supported by the framework, each of the living units having a shape and the units being arranged to absorb weather forces of predicted weather patterns and use the forces to bias the units toward the supporting surface and in a selected direction to increase stability of the architecture.

2. The architecture of claim 1, wherein at least one of the living units is shaped as a substantial oval.

3. The architecture of claim 1, wherein at least one of the living units is shaped as a substantial disk.

4. The architecture of claim 1, wherein the framework is equipped with an infrastructure of utility apparatus.

5. The architecture of claim 1, wherein the framework comprises an arrangement of fixed support elements.

6. An architecture comprising:

a framework; and an openwork of discrete major and minor aerodynamic living units supported by the framework each of the major and minor living units specifically shaped and arranged to absorb weather forces of predicted weather patterns and use the forces to bias the units in a selected direction to increase stability of the architecture.

7. The architecture of claim 6, wherein at least one of the major and minor living units is substantially ovoidal.

8. The architecture of claim 6, wherein at least one of the major and minor living units is substantially disk-shaped.

9. The architecture of claim 6, wherein the framework is equipped with an infrastructure of utility apparatus.

10. The architecture of claim 6, wherein the framework comprises an arrangement of fixed support members.

11. An architecture comprising a fixed openwork of discrete, aerodynamic living units that are each specifically shaped and arranged to absorb weather forces of predicted weather patterns and use the forces to bias the units in a selected direction to increase stability of the architecture.

12. The architecture of claim 11, wherein at least one of the living units is shaped as a substantial oval.

13. The architecture of claim 11, wherein at least one of the living units is shaped as a substantial disk.

14. The architecture of claim 11, wherein the units are fixed to and supported by a framework.

15. The architecture of claim 14, where in the framework is equipped with an infrastructure of utility apparatus that feeds the units.

16. The architecture of claim 14, wherein the framework comprises an arrangement of fixed support members.

17. The architecture of claim 11, wherein the openwork is upstanding.

18. An architecture comprising:

discrete and substantially disk-shaped living units supported by a framework in a substantially parallel and spaced apart condition; and discrete and substantially ovoidal living units supported by the framework between the disk shaped living units;

wherein each of the disk-shaped living units and the ovoidal living units is arranged to absorb weather forces of predicted weather patterns and use the forces to bias the units together to increase stability of the architecture.

19. The architecture of claim 18, wherein the framework is equipped with utility apparatus.

20. The architecture of claim 18, wherein the framework comprises an arrangement of fixed support members.

21. A method of erecting an architecture comprising the steps of:

selecting a building site;

determining predicted weather forces likely to take place at the building site;

erecting a framework on a supporting surface at the building site; and erecting an openwork of discrete, self-contained living units in an arrangement that is capable of resisting the predicted weather forces, each of the living units having a shape and the units being arranged to use the weather forces to bias the units toward the supporting surface.

* * * * *